United States Patent [19]

Matsumura et al.

[11] Patent Number: 5,290,906
[45] Date of Patent: Mar. 1, 1994

[54] POLY(ARYLENE ETHER KETONE), PROCESS FOR PRODUCING SAME AND ITS USE

[75] Inventors: Shunichi Matsumura; Seiji Itoh; Hiroo Inata; Jiro Sadanobu, all of Iwakuni, Japan

[73] Assignee: Teijin Limited, Osaka, Japan

[21] Appl. No.: 644,978

[22] Filed: Jan. 23, 1991

Related U.S. Application Data

[63] Continuation-in-part at PCT/JP90/00650, May 22, 1990.

[30] Foreign Application Priority Data

| May 23, 1989 [JP] | Japan | 1-127742 |
| Dec. 22, 1989 [JP] | Japan | 1-331138 |
| Dec. 22, 1989 [JP] | Japan | 1-331139 |

[51] Int. Cl.$^5$ .................... C08G 8/02; C08G 14/00; C08G 61/12; B32B 9/00
[52] U.S. Cl. ................... 528/125; 528/126; 528/174; 528/175; 528/220; 525/390; 525/534; 428/357; 428/364; 428/394; 428/411.1
[58] Field of Search ............. 528/125, 126, 220, 174, 528/175; 525/534, 390; 428/411.1, 394, 357, 364

[56] References Cited

U.S. PATENT DOCUMENTS

| 4,870,153 | 9/1989 | Matzner et al. | 528/125 |
| 4,889,909 | 12/1989 | Besecke et al. | 528/125 |
| 4,954,604 | 9/1990 | Genz et al. | 528/125 |

FOREIGN PATENT DOCUMENTS

| 62-231016 | 10/1987 | Japan . |
| 63-500383 | 2/1988 | Japan . |
| 1-161018 | 6/1989 | Japan . |

OTHER PUBLICATIONS

Hergenrother et al., Polymer, vol. 29, Feb., 1988 pp. 358-369.

*Primary Examiner*—John Kight, III
*Assistant Examiner*—P. Hampton-Hightower
*Attorney, Agent, or Firm*—Wenderoth, Lind & Ponack

[57] ABSTRACT

A poly(arylene ether ketone) of this invention principally comprises recurring units represented by formula

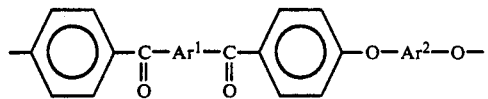

wherein Ar$^1$ denotes a 1,5-naphthalene ring, a 2,6-naphthalene ring, a 2,7-naphthalene ring or a combination of them, and Ar$^2$ denotes p-phenylene, p,p'-biphenylene, a 1,5-naphthalene ring, a 2,6-naphthalene ring, a 2,7-naphthalene ring or a combination of them.

The poly(arylene ether ketone) is high in second-order transition temperature and excellent in solvent resistance and moldability, and can be molded into heat-resistant fibers and electric insulating films.

6 Claims, 1 Drawing Sheet

POLY(ARYLENE ETHER KETONE), PROCESS FOR PRODUCING SAME AND ITS USE

This application is a continuation-in-part of PCT/JP90/00650, filed on May 22, 1990, which designated the United States.

TECHNICAL FIELD

This invention relates to a poly(arylene ether ketone), a process for producing same and its use. More specifically, this invention relates to a poly(arylene ether ketone) having a high second-order transition temperature, excellent solvent resistance and excellent moldability, a process for producing same and its use in fibers, films and other molded articles.

Further, this invention relates to novel poly(arylene ether ketone) fibers, and more specifically to poly(arylene ether ketone) fibers excellent in heat resistance, chemical resistance and mechanical properties.

Still further, this invention relates to a novel poly(arylene ether ketone) film, and more specifically to a poly(arylene ether ketone) film excellent in heat resistance, chemical resistance and mechanical properties.

TECHNICAL BACKGROUND

Polyaryl ether ketones are excellent in chemical resistance, acid resistance, alkali resistance, dimensional stability and mechanical characteristics, and have been studied as engineering plastics, fibers, films, matrices for composite materials, etc.

As a polyaryl ether ketone, a polymer wherein an aryl group is a phenylene group has been so far well known.

Namely, there have been known a process in which a polyaryl ether ketone comprising recurring units represented by formula (a)

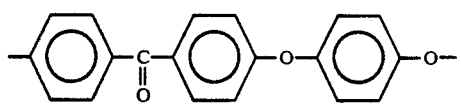

is produced by reacting 4,4'-dihalobenzophenone with hydroquinone (Japanese Laid-open Patent Appln. No. 90296/1979), a process in which a polyaryl ether ketone comprising recurring units represented by formula (b)

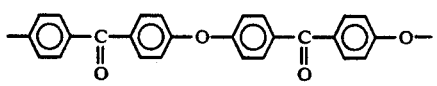

is produced by reacting 4,4'-dihalobenzophenone with 4,4'-dihydroxybenzophenone (Japanese Patent Publication No. 22939/ 1982), and a process in which a polyaryl ether ketone comprising recurring units represented by formula (c)

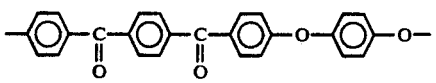

is produced by reacting bis(p-halobenzoyl)benzene with hydroquinone (Japanese Laid-open Patent Application Nos. 34900/1978 and 97094/1978).

Heat resistance of these polyaryl ether ketones is not altogether enough, and development of polyaryl ether ketones having excellent heat resistance has been demanded.

Japanese Laid-open Patent Application No. 29427/1989 discloses an aromatic polyketone copolymer comprising 15 to 90 mol % of structural units represented by formula (d)

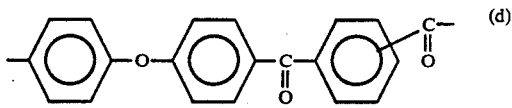

and 10 to 85 mol % of structural units presented by formula (e)

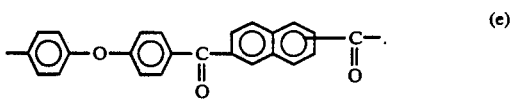

Japanese Laid-open Patent Application No. 33132/1989 discloses an aromatic polyketone copolymer comprising 50 to 85 mol % of structural units represented by formula (e) and 15 to 50 mol % of structural units represented by formula (f)

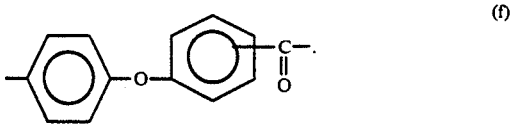

Japanese Laid-open Patent Application No. 33132/1989 involves an aromatic polyketone copolymer comprising 15 to 40 mol % of structural units represented by formula (g)

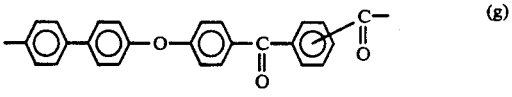

and 60 to 85 mol % of structural units represented by formula (h)

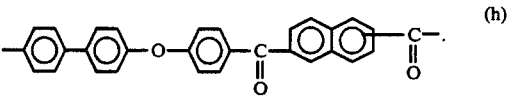

WO89/04848 internationally laid open on Jun. 1, 1989 includes an arylene ether ketone copolymer comprising (a) 99 to 10 mol % of recurring units represented by formula (I)

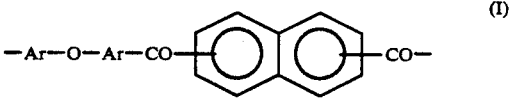

and (b) 1 to 90 mol % of recurring units represented by formula (II)

wherein each Ar denotes a m-phenylene group, a p-phenylene group, or a di-m-phenylene group, a di-p-phenylene group, a poly-m-phenylene group or a poly-p-phenylene group in which plural phenylene rings are bound together by a direct bond, —O— or —CO—, and a homopolymer comprising only the recurring units of formula (I).

However, WO89/04848 does not describe at all a homopolymer wherein the recurring units of formula (I) are those represented by the following formula:

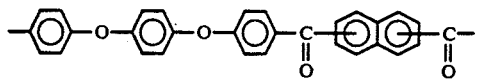

Moreover, the present inventors have found that the homopolymer comprising the recurring units represented by the above formula is not obtained by a process in which a corresponding naphthalenedicarboxylic acid halide is reacted with 4,4'-diphenoxybenzene.

Poly(arylene ether ketones) are crystalline, heat-resistant thermoplastic resins and are known to be excellent in heat resistance, chemical resistance and electrical properties; they are being developed as engineering plastics making use of these profitable characteristics. Accordingly, formation of fibers from poly(arylene ether ketones) has industrially great significance.

Examples of formation of fibers from poly(arylene ether ketones) are still limited nowadays. While fibers of polyether ether ketones (PEEK) are described in Japanese Laid-open Patent Application Nos. 191,322/1982 and 231,016/1987, and Sen-i Gakkaishi vol. 41, 59 (1985), vol. 43, 507 (1987) and vol. 45, 509 (1989). Fibers of polyether ketones (PEK) are disclosed in Japanese Patent Publication No. 33,419/81.

The poly(arylene ether ketone) fibers disclosed in the above known literature are hardly said to have sufficient mechanical properties, and their Young's modulus remains at a low level compared with e.g. commercial polyester fibers. Moreover, a glass transition temperature of a starting material is 143° C. in PEEK and 154° C. in PEK. Fibers formed from melt-moldable poly(arylene ether ketones) having a higher glass transition temperature have been thus expected.

Regarding the poly(arylene ether ketones) which are being developed as engineering plastics as stated above, formation of films therefrom has also industrially great significance.

Examples of films of poly(arylene ether ketones) are still limited at present. While fibers of polyether ether ketones (PEEK) are described in Japanese Laid-open Patent Application Nos. 137,166/1978, 63,417/1983 and 1,879,284/1985, but examples of films of poly(arylene ether ketones) other than PEEK are few.

PEEK has the aforesaid excellent properties but its glass transition temperature is 143° C. Films of melt-moldable poly(arylene ether ketones) having a higher glass transition temperature have thus been demanded.

DISCLOSURE OF INVENTION

It is an object of this invention to provide a novel poly(arylene ether ketone).

A further object of this invention is to provide a novel poly(arylene ether ketone) having higher heat resistance than a conventional poly(arylene ether ketone).

A still further object of this invention is to provide a poly(arylene ether ketone) which is high in second-order transition temperature but not so high in melting point and therefore excellent in moldability.

Another object of this invention is to provide a poly(arylene ether ketone) which has high crystallizability and suitable crystallinity for molding of fibers and films, making it possible to easily and smoothly conduct processing after melt molding, e.g. hot stretching of a film obtained by melt molding.

Still another object of this invention is to provide a process for producing the above poly(arylene ether ketone).

The other object of this invention is to provide a fiber, a film, etc. composed of the above poly(arylene ether ketone) of this invention upon utilizing the above excellent performance of the poly(arylene ether ketone) of this invention.

The other objects and advantages of this invention will be clarified by the following explanation.

According to this invention, the above objects and advantages of this invention are achieved by a crystalline poly(arylene ether ketone) principally comprising the recurring units represented by formula (1)

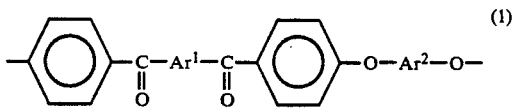

wherein $Ar^1$ denotes a 1,5-naphthalene ring, a 2,6-naphthalene ring, a 2,7-naphthalene ring or a combination of them, and $Ar^2$ denotes p-phenylene, p,p'-biphenylene, a 1,5-naphthalene ring, a 2,6-naphthalene ring, a 2,7-naphthalene ring or a combination of them, and having inherent viscosity of at least 0.3 measured at 30° C. in conc. sulfuric acid.

In formula (1), $Ar^1$ denotes a 1,5-naphthalene ring, a 2,6-naphthalene ring, a 2,7-naphthalene ring or a combination of them. Most preferable of these is a 2,6-naphthalene ring represented by formula:

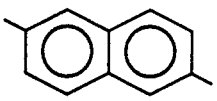

In formula (1), $Ar^2$ denotes p-phenylene, p,p'-biphenylene, a 1,5-naphthalene ring, a 2,6-naphthalene ring, a 2,7-naphthalene ring or a combination of them. Most preferable of these is p-phenylene represented by formula:

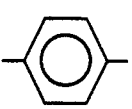

Thus, as the recurring units of formula (1), recurring units represented by formula

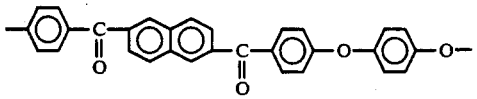

wherein Ar$^1$ is a 2,6-naphthalene ring and Ar$^2$ is p-phenylene,
are especially preferable.

The crystalline poly(arylene ether ketone) of this invention principally comprises the recurring units of formula (1). As the other recurring units than those of formula (1), for example, the above known recurring units (a)–(h) and those of the following formula are available.

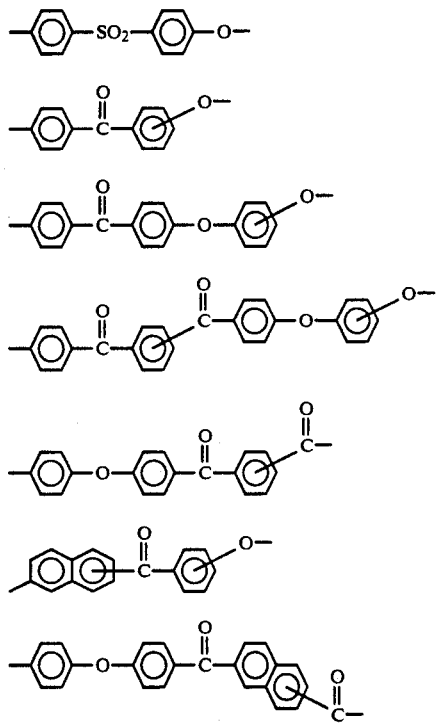

The crystalline poly(arylene ether ketone) of this invention contains at least 70 mol %, preferably at least 80 mol % of all the recurring units. Above all, the crystalline poly(arylene ether ketone) substantially comprising the recurring units of formula (1) is preferable in this invention.

The poly(arylene ether ketone) of this invention has inherent viscosity ($\eta$inh) of at least 0.3 measured at 30° C. in conc. sulfuric acid.

Inherent viscosity is preferably at least 0.4, more preferably at least 0.5. The upper limit of inherent viscosity is preferably 2.0, more preferably 1.5. Desirous moldability is achieved by a poly(arylene ether ketone) having the above suitable inherent viscosity.

The high second-order transition temperature is one of the characteristics of the poly(arylene ether ketone) of this invention. The second-order transition temperature (Tg) is preferably at least 170° C., more preferably at least 175° C. as measured by differential scanning calorimetry (DSC). The melting point (Tm) is preferably 300° C. to 400° C., more preferably 320° to 385° C. as measured by DSC.

The poly(arylene ether ketone) of this invention can be produced, according to this invention, by a process characterized by heat-polycondensing a starting material composed principally of bis(p-fluorobenzoyl)naphthalene represented by formula (2)

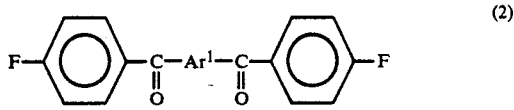

wherein Ar$^1$ is as defined in formula (1), and an aromatic dihydroxy compound represented by formula (3)

HO—Ar$^2$—OH (3)

wherein Ar$^2$ is as defined in formula (1), at a temperature of 300° to 350° C. in an inert medium in the presence of at least one alkaline compound selected from the group consisting of hydroxides, carbonates and bicarbonates of alkali metals to produce a crystalline poly(arylene ether ketone) principally comprising the recurring units of formula (1) and having inherent viscosity of at least 0.3 measured at 30° C. in conc. sulfuric acid.

In formula (2), Ar$^1$ is as defined in formula (1). The bis(p-fluorobenzoyl)naphthalene of formula (2) therefore includes bis-1,5-(p-fluorobenzoyl)naphthalene, bis-2,6-(p-fluorobenzoyl)naphthalene, bis-2,7-(p-fluorobenzoyl)naphthalene, and a combination of them.

In formula (3), Ar$^2$ is as defined in formula (1). The aromatic dihydroxy compound of formula (3) therefore includes hydroquinone, 4,4'-dihydroxybiphenyl, 1,5-dihydroxynaphthalene, 2,6-dihydroxynaphthalene, 2,7-dihydroxynaphthalene and a combination of them.

The process of this invention is performed by heating a starting material principally comprising bis(p-fluorobenzoyl)naphthalene of formula (2) and the aromatic dihydroxy compound of formula (3) in an inert solvent in the presence of an alkali compound.

Examples of the other starting compound that can be used besides the compounds of formula (2) and (3) are 4,4'-difluorobenzophenone, 1,4-bis(p-fluorobenzoyl)benzene, 4,4'-bis(p-fluorobenzoyl)diphenyl, 1,3-bis(p-fluorobenzoyl)benzene, 4,4'-bis(p-fluorobenzoyl)diphenyl ether, 4,4'-dihydroxybenzophenone, 2,2-bis(p-hydroxyphenyl)propane, bis(p-hydroxyphenyl)sulfone, 4-fluoro-4'-hydroxybenzophenone, 4-chloro-4'-hydroxybenzophenone, 4-(p-fluorobenzoyl)-4'-hydroxydiphenyl ether, 2-(p-fluorobenzoyl)-6-hydroxynaphthalene, and 4-chloro-4'-hydroxydiphenylsulfone.

It is advisable that the compounds of formula (2) and (3) are used such that the amount of the aromatic dihydroxy compound of formula (3) is 0.98 to 1.02 mols per mol of bis(p-fluorobenzoyl)naphthalene of formula (2).

It is readily understandable that in using the other starting compound, its amount is such that all the starting compounds are reacted with one another to form an aryl ether ketone polymer chain.

It is advisable that the compounds of formula (2) and (3) are contained in amounts of at least 70 mol %, especially preferably at least 80 mol % of all the starting materials.

Examples of the inert medium used in the reaction include diphenylsulfone, N-methyl-2-pyrrolidone and sulforan. Among them, diphenyl sulfone is most preferable.

Examples of the alkali compound include hydroxides, carbonates and bicarbonates of alkali metals. They may be used either singly or in combination. Preferable examples of the alkali compound include potassium hydroxide, sodium hydroxide, potassium carbonate, sodium carbonate, potassium bicarbonate and sodium bicarbonate. Of these, potassium carbonate and sodium carbonate are most preferable. The alkali compound is used at a high enough ratio to catch all the fluorine atoms in the starting material, preferably at such ratio that the equivalent of the alkali metal atom is approximately equal to that of the fluorine compound in the starting material. That is, the amount of the alkali compound is preferably about 1 to 2 equivalents relative to the fluorine atom of the starting material.

The reaction is conducted by finally heating at a temperature of 300° to 360° C. When the starting material contains a compound having a boiling point lower than 300° C., e.g. hydroquinone, it is advisable to conduct the reaction first at a temperature lower than 300° C., e.g. 200° to 250° C. and then finally 300° to 360° C. As the reaction advances, an alkali metal fluoride is formed as a by-product in a reaction system, while the poly(arylene ether ketone) of this invention is formed as an end product.

After the polymerization reaction proceeds to a desirous extent, a monofunctional end capping agent can be added to the reaction system to block the terminal hydroxyl group of the resulting polymer with the end capping agent.

The addition of the end capping agent may be conducted after termination of the polymerization reaction and at times at the initial stage of the polymerization, e.g. simultaneously with the feeding of the polymerization starting materials.

Preferable examples of the monofunctional end capping agent are p-chlorobenzophenone, p-fluorobenzophenone, p-fluorobenzyldiphenyl and methyl chloride. The end-capped polymer shows good stability in molding, e.g. melt-molding.

After the polycondensation reaction, the poly(arylene ether ketone) of this invention can be isolated from the reaction system by, for example, solidifying the reaction system, pulverizing the resulting product if required, and removing the inert medium and the alkali metal fluoride as the by-product with e.g. acetone, methanol and water by extraction either simultaneously or stepwise.

The bis(p-fluorobenzoyl)naphthalene of formula (2) used in the process of this invention can advantageously be produced by either a method (A) in which an acid halide of a corresponding naphthalenedicarboxylic acid is reacted with at least 2 mols, per mol of the acid halide, of fluoro benzene in a reaction solvent in the presence of Lewis acid or a method (B) in which naphthalene is reacted with at least 2 mols, per mol of naphthalene, of a p-fluorobenzoyl halide in a reaction solvent in the presence of Lewis acid.

The above methods (A) and (B) will be clearly explained as follows.

The poly(arylene ether ketone) of this invention can be used in various fields by utilizing its excellent solvent resistance and high second-order transition temperature. For example, the poly(arylene ether ketone) of this invention is advantageously used to produce fibers, films, matrix resins of fiber-reinforced composite materials and other molded articles.

According to this invention, the aforesaid objects and advantages can be achieved by polyarylene ether ketone fibers composed of a crystalline poly(arylene ether ketone) principally comprising recurring units represented by formula (1)

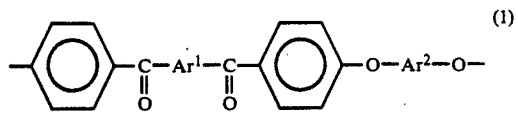

wherein $Ar^1$ denotes a 1,5-naphthalene ring, a 2,6-naphthalene ring, a 2,7-naphthalene ring or a combination of them, and $Ar^2$ denotes p-phenylene, p,p'-biphenylene, a 1,5-naphthalene ring, a 2,6-naphthalene ring, a 2,7-naphthalene ring or a combination of them, and having inherent viscosity of at least 0.3 measured at 30° C. in conc. sulfuric acid, said fibers having Young's modulus of at least 1,000 kg/mm$^2$.

The polymer constituting the fibers of this invention has the recurring units represented by formula (1) wherein $Ar^1$ is a group of a naphthalene ring having two bonding sites. It is preferable that the bonding sites are in the 1,5-, 2,6- or 2,7-position. Of these, the 2,6-position are most preferable.

Moreover, $Ar^2$ in formula (1) is a divalent aromatic group. Examples of the aromatic group are as follows.

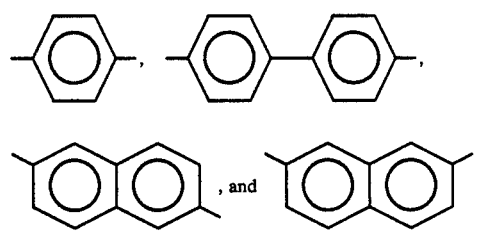

Preferable of these groups are:

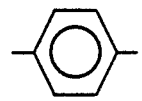

The amount of the recurring units of formula (1) making up the poly(arylene ether ketone) is at least 70 mol %, preferably at least 80 mol %, more preferably 90 mol % of all the recurring units.

The poly(arylene ether ketone) is further preferably a poly(arylene ether ketone) principally comprising recurring units represented by formula (4)

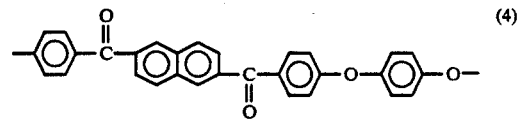

and the fibers of the poly(arylene ether ketone) principally comprising the recurring units of formula (4) possess especially excellent melt-moldability and mechanical properties.

The poly(arylene ether ketone) used in this invention has inherent viscosity of at least 0.3, preferably at least 0.4 measured at 30° C. in conc. sulfuric acid. When the inherent viscosity is less than 0.3, mechanical properties of fibers are undesirously insufficient. The poly(arylene ether ketone) used in this invention may be blended with a thermoplastic resin to improve fluidity and moreover contain additives such as a stabilizer, an antioxidant and a UV absorber.

The poly(arylene ether ketone) fibers of this invention can be produced by melt-molding the poly(arylene ether ketone). That is, said fibers are obtained by melting the polymer at a temperature of Tm+20° C. to Tm+50° C. (Tm is a melting point of the polymer), then melt-extruding the molten polymer via a spinneret, and cooling and solidifying the extrudate, followed by winding up.

It is advisable that a heating cylinder for slowly cooling spun yarns is mounted just under the spinneret. The temperature of the atmosphere in the heating cylinder is desirously Tm−50° C. to 60° C.

The unstretched fibers obtained by melt-spinning are subsequently hot stretched in, or under contact with, a heating medium held at a temperature at least Tg−80° C. to at most Tm, preferably Tg−50° C. to Tm−20° C., thereby exhibiting excellent mechanical properties.

Stretching can be conducted at one or more stages.

Multistage stretching is preferably that first stage stretching is conducted at Tg−50° C. to Tc−5° C., second stage stretching at Tc to Tm−20° C., and more preferably that first stretching is conducted at Tg−10° to Tc−5° C., second stage stretching at Tc to Tc+60° C., and third stage stretching at (Tc+67° C. or second stage stretching temperature+20° C. whichever is higher) to Tm−20° C. (Tc is a crystallization temperature of an unstretched yarn measured by DSC). This results in higher orientation.

The fibers of the poly(arylene ether ketone) in this invention exhibit Young's modulus of at least 1,000 kg/mm$^2$, preferably at least 1,400 kg/mm$^2$ by the aforesaid process.

When the Young's modulus of the poly(arylene ether ketone) fibers in this invention is less than 1,000 kg/mm$^2$, the general industrial usage thereof is limited.

The poly(arylene ether ketone) fibers in this invention can have especially excellent mechanical properties when forming a specific fine structure. The specific fine structure here referred to is a fine structure characterized in that a crystal size ($L_1$) normal to cryatal lattice plane (which is) perpendicular to a fiber axis is at least 60 Å, preferably 70 to 200 Å, a cryatal size ($L_2$) normal to crystal lattice plane (which is) parallel to the fiber axis is at most 140 Å, preferably 50 to 130 Å, and a degree of orientation is at least 90%, preferably at least 93%.

The crystal lattice plane perpendicular to the fiber axis, here referred to corresponds to a diffraction peak obtained by meridional scanning when the fiber axis is taken in a meridional direction. The crystal surface parallel to the fiber axis corresponds to a diffraction peak obtained by equatorial scanning. They are both typified by the diffraction peaks having the maximum crystal sizes. The degree of orientation is a degree of orientation of a crystal found from an orientation angle of the peak of the maximum crystal size in the meridional direction.

In the poly(arylene ether ketone) fibers of this invention, when $L_1$ is less than, 60 Å, the fibers are easily softened at a temperature of at least Tg. When $L_2$ exceeds 140 Å, the fibers tend to become fragile. When the degree of orientation is less than 90%, Young's modulus is insufficient.

Reports on the fine structure of the poly(arylene ether ketone) fibers have been so far few, and are limited to those on the fine structure of polyether ether ketone (PEEK) fibers.

A report of Shimizu et al Sen-i Gakkaishi, vol. 41, No. 11T-461 (1985) gives the similar parameters of the fine structure of the PEEK fibers. However, the PEEK fibers having the crystal size to meet $L_1 \geqq 60$ Å and $L_2 \leqq 140$ Å. show Young's modulus as small as 600 kg/mm$^2$. It is considered that in the Shimizu et al report, the coarse crystal grains are formed by heat treating PEEK at a high temperature for a long period of time, and the mechanical properties are thus reduced.

Especially, the poly(arylene ether ketone) principally comprising the recurring units of formula (4) is easier to form crystals than PEEK.

The poly(arylene ether ketone) fibers of this invention can exhibit excellent mechanical properties utilizing strong cohesion inherent in the polymer by suppressing the crystal size parallel to the fiber axis and expediting growth of crystals perpendicular to the fiber axis.

The poly(arylene ether ketone) fibers of this invention are generally formed by the above process, having the Young's modulus of at least 1,000 kg/mm$^2$. By forming the above specific fine structure, the fibers show quite high Young's modulus of at least 1,500 kg/mm$^2$ for fibers spun from an isotropic melt. The tensile strength of said fibers can exceed 80 kg/mm$^2$.

In the specific fine structure, it is necessary to employ the producing conditions which are more limited than those of the above process.

First in the spinning, there is a need to obtain unstretched fibers having a specific gravity of less than 1.29 and substantially free from crystalline components as observed by X-ray diffraction which means that a wide angle X-ray diffraction pattern has no clear crystal peak. This is realized, for example, at a spinning temperature of 390° to 410° C. and at a spinning cylinder temperature of 340° to 390° C. in the polymer of the structure represented by formula (4).

In the stretching, the first stage stretching conditions are employed that allow clear crystal whitening under the aforesaid conditions. Said crystal whitening disappears simultaneously with orientation and crystallization of the fibers and occurs at a temperature near Tg above a specific stretch ratio. For instance, in the unstretched fibers of the polymer of formula (4) having a specific gravity of at least 1.29 and substantially free from crystalline components as measured by X-rays, this whitening phenomenon can occur at a stretching temperature of 175° to 200° C. and a stretch ratio of at least 2X.

The whitened fibers do not influence properties even if becoming transparent or keeping the whitened state by stretching from the second stage or by heat setting.

The fibers after the first stage stretching require the overall stretch ratio of at least 4X under the aforesaid second or third stage stretching.

In the general fibers, marked whitening in the usual stretching suggests occurrence of voids, reducing the mechanical properties of the fibers in many cases. In the poly(arylene ether ketone) fibers of this invention, no such deterioration is observed, and the controlled growth of crystals takes place while highly maintaining the orientation at the heat setting and crystallization stage after the second stage stretching. When the conditions under which whitening does not occur in the first stage stretching owing to a low stretching temperature or a low stretch ratio, relaxation in heat setting is great and high orientation is hardly maintained. When whitening does not occur due to a high stretching temperature, stretching/orientation efficiency is decreased.

The poly(arylene ether ketone) fibers of this invention are fibers which are excellent in heat resistance and mechanical properties, have the naphthalene ring in the main chain of the starting polymer and therefore, compared to fibers of a polyether ketone composed of a phenylene group alone, provide a high glass transition temperature and exhibit Young's modulus of at least 1,000 kg/mm² by stretching and orientation.

Moreover, when the poly(arylene ether ketone) fibers of this invention form the specific fine structure, especially excellent mechanical properties are shown and the Young's modulus is at least 1,500 kg/mm².

The poly(arylene ether ketone) fibers of this invention can be widely used as industrial fibers. They are useful, for example, as monofilaments in joint core materials of heat-resistant, hot water-resistant heavy cloths such as heat-resistant, wear-resistant brushes and dryer canvuses and wear-resistant, highly elastic strings, and as multifilaments in heat-resistant, chemical-resistant filters and packings, and matrices for composite materials with high-strength, highly elastic fibers such as inorganic fibers, e.g. glass fibers, carbon fibers and ceramic fibers or aromatic polyamide fibers. For instance, mixed woven fabrics of the poly(arylene ether ketone) fibers of this invention and the high-strength, highly elastic fibers are hot pressed at a temperature above the melting point of the fibers of this invention to form a fiber-reinforced composite material wherein the poly(arylene ether ketone) is a matrix resin.

Further, according to this invention, the above objects and advantages are achieved by a poly(arylene ether ketone) film composed of a crystalline poly(arylene ether ketone) principally comprising the recurring units represented by formula (1)

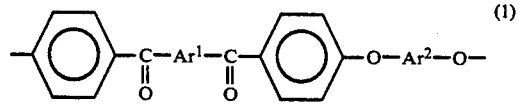

wherein $Ar^1$ denotes a 1,5-naphthalene ring, a 2,6-naphthalene ring, a 2,7-naphthalene ring or a combination of them, and $Ar^2$ denotes p-phenylene, p,p'-biphenylene, a 1,5-naphthalene ring, a 2,6-naphthalene ring, a 2,7-naphthalene ring or a combination of them, said film having Young's modulus of at least 400 kg/mm² and a tan δ peak temperature (tan δ is measured at 1 Hz) of at least 160° C. in measuring dynamic viscoelasticity.

The polymer constituting the film of this invention is the same as the above-described polymer constituting the fibers of this invention.

A more preferable poly(arylene ether ketone) principally comprises recurring units of formula (4)

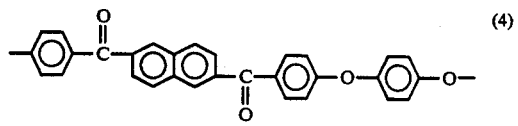

and a film of the poly(arylene ether ketone) principally comprising the recurring units of formula (4) is especially excellent in melt-moldability and mechanical properties.

The poly(arylene ether ketone) used in this invention has inherent viscosity of at least 0.3, preferably at least 0.4, as measured at 30° C. in conc. sulfuric acid is at least 0.3, preferably at least 0.4. When the inherent viscosity is less than 0.3, mechanical properties of the film are undesirously insufficient.

The poly(arylene ether ketone) used in this invention may be blended with resins such as polyarylene ethers, polysulfones, polyarylates, polyesters, etc. and contain additives such as a stabilizer, an antioxidant, a UV absorber, a lubricant, a filler, etc. Examples of the lubricant are inorganic substances such as talc, silica, kaolin, mica and calcium carbonate. Examples of the filler is organic substances such as silicone resin fine particles.

The poly(arylene ether ketone) film of this invention can be formed from the poly(arylene ether ketone) by melt-molding.

The poly(arylene ether ketone) film is usable in unstretched state, but can be formed into a film having higher heat resistance and mechanical strength by biaxial orientation and crystallization. On this occasion, simultaneous biaxial stretching and successive biaxial stretching are both possible; multistage stretching is also available. It is preferable that the stretching temperature is (Tg of the unstretched film) − 10° C. to Tm − 20° C. (Tg: glass transition temperature of the polymer, Tm: melting point of the polymer). In the simultaneous biaxial stretching, Tg − 10° C. to Tc + 10° C. (Tc: crystallization temperature of the polymer) is more preferable. In the successive biaxial stretching, the first stage stretching temperature can be selected from $T_1 = Tg - 10°$ to Tc + 10° C. and the second stage stretching temperature from $T_2 = T_1 + 10°$ C. to (Tc + 100° C. or Tm − 20° C. whichever is lower). The stretch ratio is not limited in particular. It is however desirous that an area ratio is at least 4X, especially preferably at least 6X. The stretched film is preferably heat treated at a temperature above a crystallization temperature of the poly(arylene ether ketone) but below its melting point. The temperature of the heat treatment is most preferably Tc + 10° C. to Tc + 100° C.

At this time, relaxing heat treatment can be conducted if required.

The thickness of the stretched, heat-treated film can be selected from the range of 1 to 200 microns.

By the biaxial orientation and crystallization, there is provided a film in which Young's modulus of at least 400 kg/mm² is exhibited, thermal properties are more improved and a tan peak temperature in measuring dynamic viscoelasticity (1Hz) is at least 160° C.

Where Young's modulus of the poly(arylene ether ketone) film in this invention is less than 400 kg/mm², rigidity and handability of the thin film are poor, and its use is limited.

When the tan peak temperature in measuring dynamic viscoelasticity (1 Hz) of the film in this invention is lower than 160° C., heat resistance of the film is insufficient.

Especially, the specific fine structure is imparted to the poly(arylene ether ketone) film principally comprising the recurring units of formula (4) to thereby exhibit better mechanical properties.

The special fine structure here referred to is characterized by two types of crystal lattice planes (lattice spacings = about 3.9 Å and 4.7 Å) selectively orientable in parallel with the film surface, one of them having overwhelmingly superior selective orientation to the other. To explain in more detail, when the film surface is subjected to wide-angle X-ray diffraction by symmetrical-reflection technique, a diffraction pattern consisting of two main peaks corresponding to the lattice spacings of about 3.9 Å and about 4.7 Å is provided, and characterized in that a ratio of intensity I(4.7 Å) of the diffraction peak corresponding to the lattice spacing of 4.7 Å/intensity I(3.9 Å) of the diffraction peak corresponding to the lattice spacing of 3.9 Å I(4.7 Å)/I(3.9 Å)] is at most 0.6, preferably 0 to 0.4. The X-ray diffraction peak measured by symmetric-reflection technique corresponds to crystal lattice plane oriented parallelly to the film surface. The peaks of the lattice spacings of 3.9 Å and 4.7 Å measured here are crystal lattice planes parallel to the film surface when the polymer principally comprising the recurring units of formula (4) is planar-oriented, and therefore crystal lattice planes parallel to the molecular chain axis. The individual lattice spacings vary at times with the molding conditions and are 3.9±0.2 Å and 4.7±0.3 Å. The poly(arylene ether ketone) film having the special fine structure in this invention is a film in which one of the two crystal lattice planes is highly oriented parallel to the film lattice planes. This highly selectively oriented crystal lattice planes corresponds to the lattice spacings of 3.9 Å. The preferred orientation of the crystal surface is ascertained from the fact that when the film is subjected to X-ray diffraction by symmetrical-transmission technique, a peak corresponding to the lattice spacing of 3.9 Å is substantially not observed though the diffraction peak of the lattice spacing of 4.7 Å is present. That is, in this geometry, only diffraction by a crystal lattice plane oriented perpendicularly to the film surface is observed. The above fact means that the crystal lattice spacing corresponding to the lattice plane of 3.9 Å does not exist substantially perpendicularly to the film surface. The selective orientation of the crystal lattice spacing can quantitatively be measured by the peak intensity ratio of the two crystal lactice planes in the X-ray diffraction pattern measured by the symmetrical-reflection technique. The poly(arylene ether ketone) film having the special fine structure in this invention has the ratio of diffraction peak intensity I (4.7 Å) corresponding to the lattice spacing of 4.7 Å/diffraction peak intensity I (3.9 Å) corresponding to the surface distance of 3.9 Å I (4.7 Å)/I (3.9 Å)) is at most 0.6, preferably 0 to 0.4. When the diffraction peak intensity ratio exceeds 0.6, a fragile film having low Young's modulus results.

The poly(arylene ether ketone) film having such special orientation (the diffraction peak intensity ratio is at most 0.6) has not been reported so far and is an extremely novel film. Said film has Young's modulus of 500 to 800 kg/mm² in any direction of the film surface and the tan δ peak temperature measured at 1 Hz of 180° to 220° C.

To provide the special fine structure, there is a need to carry out orientation of the film under more limited conditions than the aforesaid stretching conditions.

That is, it is necessary that the first simultaneous or successive biaxial stretching is performed under the above stretching conditions at such stretching temperature that the initial stress in first stretching is at least 1.0 kg/mm² and the stretch ratio (area ratio) after the simultaneous or successive biaxial stretching is at least 6X. The initial stress in monoaxial stretching here referred to shows a stress value exerted at the initial stage of the stretching. When a stress has a yield point, it agrees substantially with the yield stress. To provide the special fine structure of this invention, the stress value at the initial stage of stretching need be above the specific value. When the temperature conditions with the stress value below the specific value are employed, the degree of uni-planar orientation of this invention is low and uniformity of orientation decreases. As the temperature range of Tg−10<T<Tm−20° C. with the initial stress at monoaxial stretching of at least 1.0 kg/mm², 650° C. to 195° C. can be selected. The stretched film is then heat-set at a temperature of 220° C. to 360° C. with a fixed length preferably under tension, thereby promoting uni-planar orientation together with increase of crystallinity. At the stage of said heat setting, the thermal and mechanical properties of the film are much improved, and the effect provided by highly controlling the structure is brought forth.

The poly(arylene ether ketone) film of this invention has the naphthalene ring in the main chain of the starting polymer and therefore, compared to the poly(arylene ether ketone) composed of the phenylene group alone, shows a high glass transition temperature and good melt-moldability. By stretching and orientation, the film having as high mechanical properties as the commercial polyethylene terephthalate film results. That is, the poly(arylene ether ketone) film of this invention has Young's modulus 400 kg/mm² and a tan δ peak temperature of 160° C. or higher in measuring dynamic viscoelasticity.

The poly(arylene ether ketone) film with the special fine structure having the highly selective crystal orientation in this invention has better mechanical properties and Young's modulus of at least 500 kg/mm².

The poly(arylene ether ketone) film of this invention can find wide use by utilizing these characteristics. For example, it is available in electrically insulating materials, motor insulation, cable covering and high-quality condensers of high use temperatures, as well as in flexible printed circuits, base films for magnetic recording and films for temperature sensitive transfer.

The poly(arylene ether ketone) of this invention can also be used as a matrix resin for a fiber-reinforced composite material or as a material of molded articles such as heat-resistant containers and electrical insulating parts.

BRIEF DESCRIPTION OF DRAWINGS

In FIG. 1, 1 is a X-ray source, 2 a counter, and 3 a film.

EXAMPLES

The following Examples illustrate this invention specifically, but this invention is not limited thereto. In said Examples, "parts" are "parts by weight".

The properties in said Examples were measured as follows.

Inherent Viscosity (ηinh)

Measured at 30° C. in conc. sulfuric acid (solvent) in a concentration of 0.5 g/dl.

Glass transition temperature (Tg), melting point (Tm) and crystallization temperature (Tc) of a polymer Measured by DSC at a ratio of temperature rise of 10° C./min.

Crystal size and degree of orientation

In the X-ray diffraction, a fiber axis was taken meridionally. Scanning was conducted by a counter with respect to a diffraction angle 2 $\theta$. Regarding the equatorial scanning, a half width of a peak near a lattice spacing of 4.7±0.5 Å was found; regarding the meridional scanning, that of a peak near a lattice spacing of 21.5±0.5 Å was found. Calculation was made according to the following Scherer's equation.

$$\text{Crystal size} = \frac{\lambda}{\beta \cos \theta}$$

wherein $\lambda$ is a wavelength of X-rays and $\beta$ is a peak half width (radian) after correction of a constant of a device.

In the meridional measurement, it is advisable to use a position sensitive-type proportional counter (PSPC).

A degree of orientation of a crystal was found according to the following formula by using a half width w of a diffraction intensity distribution calculated when setting a peak near a surface distance 4.7±0.5 Å at 2 $\theta$ and turning the fiber in the azimuthal direction.

$$\text{Degree of orientation of a crystal} = (w/180) \times 100 \, (\%)$$

Tensile test

Strength, Young's modulus and elongation of fibers were measured by elongating a monofilament 50 mm long at a constant elongating rate of 100%/min.

Initial stress in monoaxial stretching

Using a constant rate tensile tester fitted with a heating oven, an unstretched film was elongated at an elongation rate of 100%, and the maximum stress between 0 and 100% as strain was made an initial stress in monoaxial stretching. At this time, the sample is 20 mm wide and 30 mm long. When the film is anisotropic, a value in the maximum direction is employed.

Properties of a stretched film

Young's modulus, strength and elongation of a stretched film were found by a constant rate tensile test of elongating a sample 100 mm wide and 100 mm long at a constant rate of 100%/ min.

Dynamic viscoelasticity

Measured by a solid analyzer RSA-II (a trade name for a machine of Rheometrics) with an stretching mode (1Hz).

Degree of uni-planar orientation

Figure 1:
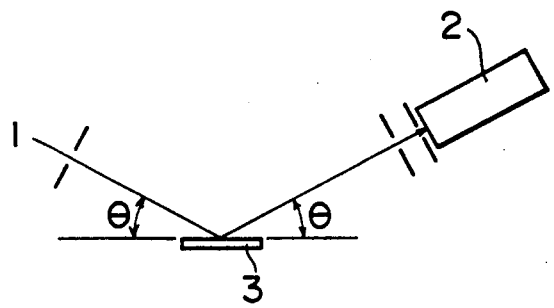
FIG. 1 is a diagram of a geometric configuration of symmetrical reflection.

The film surface was subjected to X-ray diffraction in a geometric configuration of symmetrical reflection shown in FIG. 1. Scanning was conducted at 2 $\theta$ = 10° to 40° by a counter. The factors of absorption and air scattering were corrected. Then, as to peaks near lattice spacings of 4.7 Å and 3.9 Å, intensity values of the peaks were made i(4.7 Å) and i(3.9 Å)(cps) and half widths of peaks w(4.7 Å) and w(3.9 Å) (radian) respectively, and peak intensities were found by the following equations.

$$I(4.7 \text{ Å}) = i(4.7 \text{ Å}) \times w(4.7 \text{ Å})$$

$$I(3.9 \text{ Å}) = i(3.9 \text{ Å}) \times w(4.7 \text{ Å})$$

In case the peak separation is bad or there is no peak symmetry, the smaller value of one side half widths about the peak is used.

Example 1

(1) 1,5-Naphthalenedicarboxylic acid chloride (68 parts), 150 parts of fluorobenzene, 6.4 parts of $FeCl_3$ and 250 parts of nitrobenzene were stirred and mixed for 5 hours under reflux. The reaction mixture was then charged in 1500 parts of methanol, and the precipitate was filtered. The amount of 1,5-bis(p-fluorobenzoyl)-naphthalene was 60 parts. The melting point of the product recrystallized with xylene was 214.5° C. Elemental analysis of the product showed C=77.4 wt. %, H=3.82 wt. % and F=10.2 wt. %. The product was also ascertained by measurement with IR (nujol method) and NMR (dimethyl sulfoxide - $d_6$ solvent).

(2) A reaction vessel fitted with a stirrer and a distillation system was charged with 5.59 parts of 1,5-bis(p-fluorobenzoyl)naphthalene obtained in (1) above, 1.65 parts of hydroquinone and 13.3 parts of diphenylsulfone, purged with nitrogen and then heated at 250° C. About 5 minutes later, the contents were melted into a uniform solution. Then, 2.1 parts of anhydrous potassium carbonate was added, and the mixture was reacted in a nitrogen stream at 250° C. for 30 minutes under normal pressure, and then heated to 330° C., followed by the reaction for 180 minutes. The resulting reaction product was cooled and pulverized into chips having a particle size of 500 micrometers or less. Said chips were extracted twice under reflux in acetone, twice under reflux in water and once under reflux in acetone. Diphenylsulfone and the inorganic salts were removed, and the residue was then dried at 150° C. for 3 hours. The obtained polymer had ηinh=1.0, Tg=192° C. and Tm=291° C.

Example 2

(1) Seventy parts of 2,6-naphthalenedicarboxylic acid chloride, 74 parts of fluorobenzene, 74 parts of $AlCl_3$ and 200 parts of nitrobenzene were reacted at 80° C. for 10 hours with stirring. The reaction mixture was then charged in 1000 parts of methanol, and the precipitate was filtered. The product was 2,6-bis(p-fluorobenzoyl)-naphthalene and its amount was 78 parts. The melting point of the product recrystallized with dimethylformamide was 265° C. Elemental analysis of the product showed C=77.2 wt. %, H=3.90 wt. % and F=10.1 wt. %. This product was also ascertained by measurement with IR (nujol method) and NMR (dimethyl sulfoxide-$d_6$ solvent).

(2) The same reaction vessel as used in (1) of Example 1 was charged with 37.24 parts of 2,6-bis(p-fluorobenzoyl)naphthalene obtained in (1) above, 11.1 parts of hydroquinone and 67 parts of diphenyl sulfone, purged with nitrogen and then heated at 200° C. About 15 minutes later, the contents were melted into a uniform solution. Subsequently, 4.15 parts of anhydrous potassium carbonate and 7.42 parts of anhydrous sodium carbonate were added, and the mixture was reacted in a nitrogen stream under normal pressure at 200° C. for 1 hour and then at 250° C. for 1 hour. The reaction temperature was then raised to 340° C. When the reaction was run at the same temperature for 90 minutes, the reaction product gradually became viscous. The resulting reaction product was cooled and then pulverized and extracted as in (2) of Example 1, followed by removing diphenyl sulfone and the inorganic salts. The resulting polymer had $\eta inh=1.08$, $Tg=178°$ C. and $Tm=367°$ C.

Example 3

A polymer was obtained as in Example 1 except that 1.65 parts of hydroquinone was replaced with 3.75 parts of 4,4'-dihydroxydiphenylsulfone. The obtained polymer had $\eta inh=0.78$ and $Tg-218°$ C. Tm could not be found because the polymer was hardly crystallizable.

Example 4

A reaction vessel fitted with a stirrer and a distillation system was charged with 4.47 parts of 2,6-bis(p-fluorobenzoyl)naphthalene, 1.92 parts of 2,6-dihydroxynaphthalene and 23.6 parts of diphenyl sulfone, purged with nitrogen and then heated at 250° C. About 10 minutes later, the contents were melted into a uniform solution. Subsequently, 1.66 parts of anhydrous potassium carbonate was added, and the mixture was reacted in a nitrogen stream at 250° C. for 120 minutes under normal pressure and then heated to 300° C., followed by the reaction for 60 minutes. The resulting reaction product was cooled and pulverized into chips having a particle size of 500 micrometers or less. Said chips were extracted thrice under reflux in acetone and thrice under reflux in water. Diphenyl sulfone and the inorganic salts were removed, and the residue was dried at 150° C. for 4 hours. The resulting polymer had $\eta inh=0.86$, $Tg=196°$ C. and $Tm=354°$ C.

Example 5

The polymer obtained in Example 2 was dried at 200° C. for 4 hours, and injection-molded at a barrel temperature of 390° C. and a mold temperature of 160° C. with a molding cycle of about 2 minutes. The properties of the resulting molded article (plate) are as follows, ensuring that the polymer of this invention was excellent in heat resistance and mechanical properties.

| Heat distortion temperature (load 18.5 kg) | 185° C. |
| --- | --- |
| Tensile strength | 1020 kg/cm² |
| Tensile modulus | 18900 kg/cm² |
| Elongation at break | 42% |
| Flexural strength | 2190 kg/cm² |
| Flexural modulus | 33300 kg/cm² |
| Impact strength (Izod, notched) | 6.6 kg · cm/cm |

Example 6

The same reaction vessel as used in Example 4 was charged with 4.47 parts of 2,6-bis(p-fluorobenzoyl)naphthalene, 1.92 parts of 2,7-dihydroxynaphthalene and 13.8 parts of diphenyl sulfone, purged with nitrogen and then heated at 250° C. About 10 minutes later, the contents were melted into a uniform solution. Subsequently, 1.66 parts of anhydrous potassium carbonate was added, and the mixture was reacted at 250° C. for 60 minutes under normal pressure, and then heated to 300° C., followed by the reaction for 60 minutes. The temperature was further raised to 320° C. and the reaction was run for 30 minutes. The reaction product was then cooled and pulverized into chips. Said chips were extracted and dried as in Example 4. The resulting polymer had $\eta inh=0.91$, $Tg=196°$ C. and $Tm=330$.

Example 7

Using a Koka-type flow tester, the polymer obtained in Example 4 was melt-extruded at 390° C. through a nozzle 0.5 mm in diameter and 1 mm in length. As a result, pale yellow, transparent, tough monofilaments were obtained.

Example 8

The polymers obtained in Examples 4 and 6 were dipped in solvents, i.e. methanol, acetone, xylene, trichlene and dioxane at room temperature for 10 days, but dissolution and swelling did not occur at all.

Example 9

A polyaryl ether ketone comprising the recurring units represented by formula

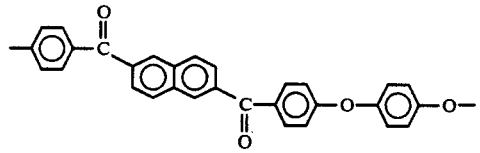

and having an inherent viscosity of 0.6, which was produced in the same way as in Example 2, was melted at 400° C., and then spun at a spinneret temperature of 390° C. using an ordinary spinneret 0.2 mm in diameter and 0.6 mm in length. The spun yarns were passed through a heating cylinder having a temperature of 380° C., then cooled with air and wound up at a rate of 30 m/min. Tm of the polymer was 367° C. The spun yarns had $Tg=176°$ C. and $Tc=215°$ C.

The unstretched yarns were stretched to 3.4 times at 180° C. and heat treated with a fixed length at 240° C. The properties of the resulting fibers are as follows.

| Young's modulus | 1032 kg/mm² |
| --- | --- |
| Tensile strength | 57 kg/mm² |
| Tensile elongation | 9% |

The experiments were run in the same way as in Example 9 except that the heat treatment was conducted at 260° to 300° C. The properties of the resulting fibers are shown in Table 1.

TABLE 1

| | Heat treatment temperature (°C.) | Young's Modulus (kg/mm²) | Tensile strength (kg/mm²) | Tensile elongation (%) |
| --- | --- | --- | --- | --- |
| Example 10 | 260 | 1042 | 58 | 9 |
| Example 11 | 280 | 1021 | 57 | 9 |
| Example 12 | 300 | 1000 | 56 | 8 |

Example 13

Unstretched yarns were obtained in the same way as in Example 9 except that the inherent viscosity of the polymer used was 0.8. Said unstretched yarns were stretched to 3.4 times at 180° C. and then to 1.15 times at 260° C. The properties of the resulting fibers are as follows.

| | |
|---|---|
| Young's modulus | 1047 kg/mm² |
| Tensile strength | 70 kg/mm² |
| Tensible elongation | 10% |

The same unstretched yarns as used in Example 13 were stretched at three stages under the conditions shown in Table 2.

TABLE 2

| | 1st stage stretching | | 2nd stage stretching | | 3rd stage stretching | | Young's modulus (kg/mm²) | Tensile strength (kg/mm²) | Tensile elongation (%) |
|---|---|---|---|---|---|---|---|---|---|
| | Temp. (°C.) | Ratio | Temp. (°C.) | Ratio. | Temp. (°C.) | Ratio | | | |
| Example 14 | 180 | 2.3 | 240 | 1.57 | 280 | 1.25 | 1071 | 71 | 7 |
| Example 15 | 180 | 2.3 | 240 | 1.57 | 280 | 1.31 | 1095 | 70 | 6 |
| Example 16 | 180 | 2.3 | 240 | 1.57 | 300 | 1.38 | 1188 | 70 | 6 |
| Example 17 | 180 | 2.3 | 240 | 1.57 | 320 | 1.38 | 1097 | 69 | 7 |

Example 18

A polyaryl ether ketone comprising recurring units represented by formula

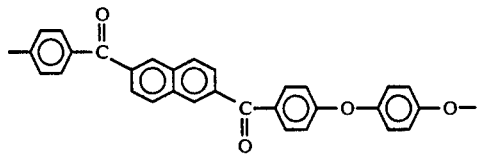

and having inherent viscosity of 0.8 was extruded at 390° C. by an extruder and cast onto a casting drum kept at 100° C. to obtain a 100 micrometer-thick unstretched film. Tm of the polymer was 367° C. The unstretched film had Tg=176° C. and Tc=215° C. measured by DSC.

The unstretched film was subjected to simultaneous biaxial stretching at an area ratio of 6X at 180° C., and then heat treated at 250° C. under a fixed area.

The obtained film showed excellent mechanical property of Young's modulus of 460 kg/mm². Regarding the heat-treated film, Tg by DSC was not measured and a tan δ peak temperature corresponding to a glass transition temperature in measurement of dynamic viscoelasticity was 191° C. (1 Hz).

Example 19

A polymer was formed in the same way as in (2) of Example 2 except that 2,6-bis(p-fluorobenzoyl)naphthalene was replaced with 2,7-bis(p-fluorobenzoyl)naphthalene. The resulting polymer had ηinh=0.97 and Tg=179° C.

Example 20

The same reaction vessel as used in (2) of Example 1 was charged with 37.24 parts of 2,6-bis(p-fluorobenzoyl)naphthalene, 9.91 parts of hydroquinone, 1.86 parts of 4,4'-dihydroxydiphenyl and 70 parts of diphenyl sulfone, purged with nitrogen and then heated at 200° C. About 15 minutes later, the contents were melted into a uniform solution. Then, 12.5 parts of anhydrous potassium carbonate was added, and the mixture was reacted in a nitrogen stream at 200° C. for 1 hour under normal pressure, then at 250° C. for 1 hour and further at 340° C. for 120 minutes. The resulting polymer was pulverized and extracted as in (2) of Example 1. The obtained polymer had ηinh=0.68, Tg=175° C. and Tm=366° C.

Example 21

Polymerization was carried out as in Example 20 except that the amount of hydroquinone was changed into 7.71 and the amount of 4,4'-dihydroxydiphenyl into 5.59 parts, respectively. The resulting polymer had ηinh=0.76, Tg=179° C. and Tm=339° C.

Example 22

The unstretched yarns obtained in Example 9 and carbon fibers (TORAYCA T-300: a tradename for a product of Toray Industries, Inc.) were interweaved such that a volume of the carbon fibers became about 60% to prepare a mixed fabric. Eight plies of the mixed fabric were laminated, and the laminate was put in a mold frame and molded under the following temperature and pressure conditions.
1) 300° to 350° C., 10 kg/cm²
2) pumping at 350° C. (0 to 30 kg/cm², 10 times)
3) elevated to 400° C. (30 kg/m²) and then kept for 20 minutes
4) cooled to 150° C.

The resulting molded sample had excellent surface properties, showed a heat distortion temperature of 300° C. or higher and was quite tough.

Example 23

The same reaction vessel as used in Example 1(2) was charged with 37.24 parts of 2,6-bis(p-fluorobenzoyl)-naphthalene, 11.01 parts of hydroquinone, 0.20 part of 4-fluorobenzophenone and 66.37 parts of diphenyl sulfone, purged with nitrogen and heated at 200° C. About fifteen minutes later, the contents were melted into a uniform solution. Then, 0.69 part of anhydrous calcium carbonate and 15.9 parts of anhydrous sodium carbonate were added, and the mixture was reacted in a nitrogen stream under normal pressure at 200° C. for 1 hour and then at 250° C. for 1 hour. The reaction temperature was then raised to 340° C. The reaction was run at the same temperature for 30 minutes. To the resulting reaction product, 3.6 parts of 4-fluorobenzophenone was added, and the mixture was reacted for 15 minutes, followed by cooling. In the same way as in Example 1(2), the resulting product was pulverized and extracted, and diphenyl sulfone and the inorganic salts were removed. The resulting polymer had ηinh=0.768, Tg=177° C. and Tm=376° C. This polymer was dried at 150° C. for 6 hours and melt-extruded at 420° C. by a Koka-type flow tester from a nozzle 0.5 mm in diameter and 1 mm in length. Melt viscosity at a shear rate of $10^3$ sec was then measured. Melt viscosity of the polymer after maintained at 420° C. for 5 minutes was 1410 poise, and that of the polymer after maintained at 420° C. for 20 minutes was 1540 poise. The resulting monofilaments were brown and transparent and free from gel. It was found that the polymer had good melt stability.

Example 24

The same reaction vessel as used in Example 1(2) was charged with 37.24 parts of 2,6-bis(p-fluorobenzoyl)-naphthalene, 11.34 parts of hydroquinone and 66.37 parts of diphenyl sulfone, purged with nitrogen and heated at 180° C. About 15 minutes later, the contents were melted into a uniform solution. Subsequently, 0.69 part of anhydrous potassium carbonate and 15.9 parts of anhydrous sodium carbonate were added, and the mixture was reacted in a nitrogen stream under normal pressure at the same temperature for 1 hour, then at 250° C. for 1 hour and further at 340° C. for 15 minutes. Subsequently, 4.0 parts of 4-(p-fluorobenzoyl)biphenyl was added, and the reaction was run for 10 minutes. The obtained reaction product was cooled, and pulverized and extracted as in Example 1(2), followed by removing diphenyl sulfone and the inorganic salts. The resulting polymer had $\eta inh=0.705$, $Tg=177°$ C. and $Tm=377°$ C. Melt viscosity of the resulting polymer was measured by a Koka-type flow tester as in Example 22. Melt viscosity of the polymer after maintained at 420° C. for 5 minutes was 1270 poise and that of the polymer after maintained at 420° C. for 40 minutes was 1370 poise. The polymer thus showed good melt stability.

Example 25

A poly(arylene ether ketone) comprising recurring units represented by formula (4)

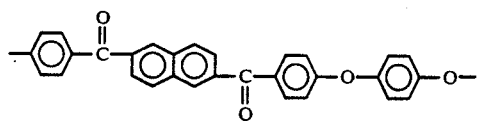
(4)

and having inherent viscosity of 0.6 was formed as in Example 23 and melted at 400° C. The melt was spun at a spinneret temperature of 390° C. using an ordinary spinneret 0.2 mm in diameter and 0.6 mm in length. The spun yarns were passed through a heating cylinder having a temperature of 380° C., then cooled with air and wound up at a rate of 30 m/min.

Tm of the polymer was 376° C. The unstretched yarns had $Tg=176°$ C. and $Tc=215°$ C.

The unstretched yarns became whitened at a stretching temperature of 180° C. and a stretch ratio of at least 4.0X.

The unstretched yarns were stretched to 4.5 times at 180° C. and then to 1.1 times at 240° C. The properties of the resulting fibers are as follows.

| Young's modulus: | 1560 kg/mm² |
| --- | --- |
| Tensile strength: | 75 kg/mm² |
| Elongation: | 7% |
| Fineness: | 6 de |

The fibers had $L_1=90$ Å, $L_2=100$ Å and a degree of orientation=95%.

Examples 26 to 28

Poly(arylene ether ketone) fibers were obtained as in Example 25 except that the second stage stretching conditions were changed as shown in Table 3. The results are shown in Table 3.

TABLE 3

| | Example 26 | Example 27 | Example 28 |
| --- | --- | --- | --- |
| Second stage stretching conditions | 270° C., 1.1 × | 300° C., 1.1 × | 320° C., 1.2 × |
| Properties of fibers | | | |
| Young's modulus (kg/mm²) | 1,523 | 1,504 | 1,721 |
| Tensile strength (kg/mm²) | 76 | 74 | 83 |
| Elongation (%) | 6 | 7 | 5 |
| $L_1$ (Å) | 113 | 122 | 136 |
| $L_2$ (Å) | 80 | 91 | 98 |
| Degree of orientation (%) | 96 | 96 | 97 |
| Fineness (de) | 6 | 5 | 6 |

Comparative Example 1

Unstretched yarns were obtained as in Example 25 and stretched to 2.5 times at 160° C. On this occasion, whitening did not occur. The stretched fibers were further stretched to 4 times at 215° C. The properties of the resulting fibers are as follows.

| Young's modulus: | 950 kg/mm² |
| --- | --- |
| Tensile strength: | 56 kg/mm² |
| Elongation: | 10% |

The fibers had $L_1=98$ Å, $L_2=73$ Å and a degree of orientation=88%.

Example 29

A (polyarylene ether ketone) comprising recurring units represented by formula (4)

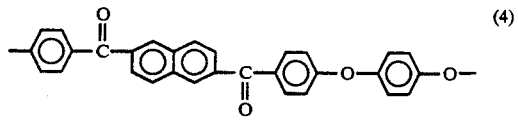
(4)

and having inherent viscosity of 0.8 was formed as in Example 23 and extruded at 390° C. by a melt extruder. The extrudate was cast onto a casting drum helt at 140° C. to obtain a 150 micron-thick unstretched film. Tm of this polymer was 376° C. The unstretched film had Tg by DSC=176° C. and Tc=215° C.

The unstretched film was subjected to simultaneous biaxial stretching at a surface ratio of 9X at 180° C., and then heat treated at 250° C. under a fixed The unstretched film had initial stress in monoaxial stretching of 3.1 kg/mm².

The resulting stretched film had excellent mechanical properties, i.e. Young's modulus o 512 kg/mm² in a machine direction (MD) and 523 kg/mm in a transverse direction (TD), strength of 25 kg/mm² in MD and 26 kg/mm² in TD and elongation of 30% in MD and 34% in TD. Said film had thickeness of 12 microns.

The tan δ peak temperature corresponding to a glass transition temperature in measuring dynamic viscoelasticity of the stretched film was 191° C. (1Hz).

Figure 2:
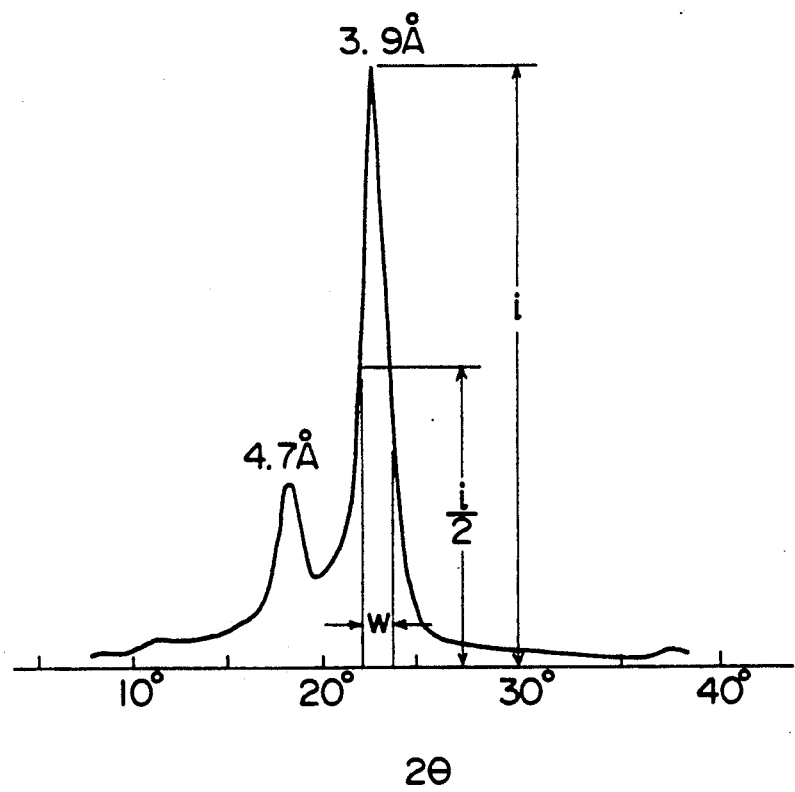
FIG. 2 is a in Example 1.

A X-ray diffraction pattern by symmetrical-reflection technique is as shown in FIG. 2. The peak intensity ratio [I(4.7 Å)/I(3.9 Å)] was 0.30.

Examples 30 to 32

An unstretched film was obtained in exactly the same way as in Example 29 and subjected to simultaneous biaxial stretching at a surface ratio of 9X at 185° C. At this time, the initial stress in monoaxial stretching at 185° C. was 2.5 kg/mm².

The above stretched film was heat treated at various temperatures shown in Table 4. The mechanical properties and the peak intensity ratio [I(4.7 Å)/(3.9 Å)] of the heat-treated film were found. The results are shown in Table 4.

TABLE 4

| | Example 29 | Example 30 | Example 31 |
|---|---|---|---|
| Heat treating temperature (°C.) | 270 | 300 | 330 |
| Properties of a film | MD/TD | MD/TD | MD/TD |
| Young's modulus (kg/mm²) | 505/500 | 515/520 | 525/520 |
| Tensile strength (kg/mm²) | 25/24 | 25/26 | 26/26 |
| Elongation (%) | 40/44 | 40/36 | 35/35 |
| Film thickness (μ) | 12 | 12 | 12 |
| I (4.7 Å)/I (3.9 Å) | 0.27 | 0.23 | 0.18 |
| tan δ peak temperature (1 Hz) | 204° C. | 205° C. | 205° C. |

Comparative Example 2

A stretched film was obtained as in Example 29 except that stretching was effected at 200° C. The initial stress in monoaxial stretching at 200° C. was 2.0 kg/mm².

The resulting stretched film had Young's modulus of 380 kg/mm² in MD and 374 in TD, tensile strength of 8 kg/mm² in MD and 7 kg/mm² in TD, elongation of 6% in MD and 6% in TD, and a peak intensity ratio [I(4.7 Å)/I(3.9 Å)] of 0.65.

Comparative Example 3

A stretched film was formed as in Example 29 except that a stretch area ratio was 1.8X.

The resulting stretched film had Young's modulus of 263 kg/mm in MD and 254 kg/mm² in TD, tensile strength of 8 kg/mm² in MD and 8 kg/mm² in TD, elongation of 12% in MD and 13% in TD, and a peak intensity ratio [I(4.7 Å)/I(3.9 Å)] of 0.8.

What we claim is:

1. A film of a crystalline poly(arylene ether ketone) in which the Young's modulus is at least 400 kg/mm², the crystalline poly(arylene ether ketone) principally comprising recurring units represented by formula (4)

$$-\bigcirc-\overset{O}{\underset{\|}{C}}-\bigcirc\bigcirc-\overset{\|}{\underset{O}{C}}-\bigcirc-O-\bigcirc-O- \quad (4)$$

and having inherent viscosity of at least 0.3 measured at 30° C. in conc. sulfuric acid,
wherein main crystal lattice planes oriented parallel to the film surface are crystal lattice planes having spacings of 3.9±0.2 Å and 4.7±0.3 Å, and an x-ray diffraction peak intensity ratio [I(4.7 Å)/I(3.9 Å)] of both crystal lattice planes measured by symmetrical-reflection technique is at most 0.4.

2. The film of claim 1 wherein the tan δ peak temperature measured at 1 Hz is at least 160° C.

3. A fiber of a crystalline poly(arylene ether ketone) in which the Young's modulus is at least 1000 kg/mm², the crystalline poly(arylene ether ketone) principally comprising recurring units represented by formula (4)

$$-\bigcirc-\overset{O}{\underset{\|}{C}}-\bigcirc\bigcirc-\overset{\|}{\underset{O}{C}}-\bigcirc-O-\bigcirc-O- \quad (4)$$

and having inherent viscosity of at least 0.3 measured at 30° C. in conc. sulfuric acid,
a crystal size ($L_1$) normal to a crystal lattice plane which is perpendicular to a fiber axis and a crystal size ($L_2$) normal to a crystal lattice plane which is parallel to the fiber axis meet the following equations $$200 \text{ Å} > L_1 > 70 \text{ Å}$$

$$130 \text{ Å} > L_2 > 50 \text{ Å}$$

and a degree of orientation of a crystal is at least 90%.

4. The fiber of claim 3 wherein the inherent viscosity of the poly(arylene ether ketone) is at least 0.4.

5. The fiber of claim 3 wherein a degree of orientation of a crystal is at least 93%.

6. The film of claim 1 wherein the inherent viscosity of the poly(arylene ether ketone) is at least 0.4.

* * * * *